United States Patent Office 3,041,341
Patented June 26, 1962

3,041,341
DERIVATIVES OF PIPERAZINE
Paul Anthony Barrett, Albert Gordon Caldwell, and Leslie Percy Walls, all of London, England, assignors to Burroughs Wellcome & Co. (U.S.A.) Inc., Tuckahoe, N.Y., a corporation of New York
No Drawing. Filed Oct. 25, 1960, Ser. No. 64,739
Claims priority, application Great Britain Oct. 26, 1959
6 Claims. (Cl. 260—268)

This invention relates to piperazine compounds and their preparation and to pharmaceutical preparations containing the compounds.

It has been discovered that the compounds of the Formula I, and if basic their acid addition salts, are useful chemical intermediates, and some of the compounds have also been found to be active against the lungworm *Dictyocaulus filaria* in guinea pigs.

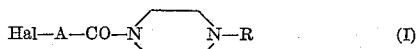

In this formula: Hal is a chlorine, bromine or iodine atom, A is a straight or branched saturated aliphatic hydrocarbon chain (having for example from 1 to 10 carbon atoms), and R is a hydrogen atom, an alkoxycarbonyl group (the alkoxy group having for example from 1 to 4 carbon atoms), an alkyl group (having for example from 1 to 5 carbon atoms) which may carry a hydroxy group or alkoxy group (having for example from 1 to 4 carbon atoms) on one or more carbon atoms other than that adjacent to the piperazine ring, or an alkoxycarbonylalkyl group (the alkoxy and alkyl groups each having for example from 1 to 4 carbon atoms).

A compound of the Formula I may be reacted with an 8-aminoquinoline of the Formula II to give a compound of the Formula III, which is a starting material in the method claimed in application No. 10,195/58 for the manufacture of 8-piperazinoalkylaminoquinolines having antiprotozoal activity.

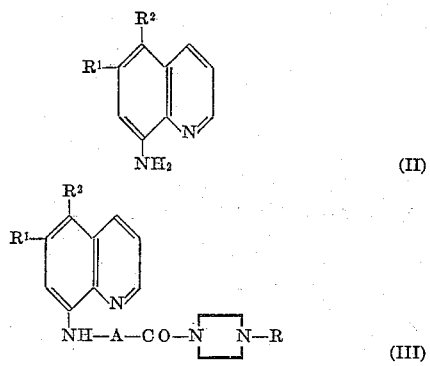

In these formulae A and R are as defined above, and $R^1$ and $R^2$ are the same or different and are hydroxy groups or alkoxy groups each having for example from 1 to 4 carbon atoms, and $R^2$ may also be a hydrogen atom. This invention in one aspect, therefore, provides compounds of the Formula I and, when such compounds are basic, acid addition salts thereof. Preferred compounds include N-3-chloropropionyl-N'-methylpiperazine and its acid addition salts, which are highly active against *Dictyocaulus filaria* in guinea pigs.

The compounds of the invention may be prepared by any known synthetic route. Conveniently they are prepared by the acylation of an N-alkyl- or N-alkoxycarbonyl-piperazine with, for example, an appropriate acid chloride or acid anhydride; the reaction may be carried out in a solvent, for example acetone or benzene, preferably in the presence of an acid binding agent, for example an alkaline salt such as sodium carbonate or an excess of the N-alkyl- or N-alkoxycarbonylpiperazine itself. It is preferable to isolate the basic compounds of the present invention as acid addition salts, for example as hydrochlorides, rather than as free bases.

This invention in a further aspect, therefore, provides the above described method of preparation of the compounds of the present invention.

The compounds of the invention may be presented in pharmaceutical preparations prepared by any of the well known methods of pharmacy.

For oral administration, fine powders or granules of the compounds may contain diluents and dispersing and surface active agents, and may be presented in a draft or drench in water or in a syrup; in capsules or cachets in the dry state or in a non-aqueous suspension, when a suspending agent may be included; in tablets when binders and lubricants may be included; or in a suspension in water or a syrup or an oil or in a water/oil emulsion, when flavouring, preserving, suspending, thickening and emulsifying agents may be included. The granules or the tablets may be coated.

For parenteral administration, the compounds may be presented in aqueous or non-aqueous injection solutions which may contain anti-oxidants, buffers, bacteriostats, agents which solubilise a relatively insoluble compound, and solutes which render the compounds isotonic with the blood; in aqueous or non-aqueous suspensions when suspending agents and thickening agents may also be included. Extemporaneous injection solutions may be prepared from sterile pills, granules or tablets which may contain diluents, dispersing and surface active agents, binders and lubricants.

The compounds may also be presented, for external use, in ointments by incorporation in a fatty or water-miscible substance, or in creams by incorporation in water or an oil, when an emulsifying agent may be included.

This present invention in yet further aspects, therefore, provides pharmaceutical preparations comprising as active ingredient a compound of the present invention together with a suitable carrier therefor, and the methods of making such preparations.

The invention will now be described with reference to the following examples, in which all temperatures are given in degrees centigrade.

This application is a continuation-in-part of applications 844,209, filed October 5, 1959, now abandoned, 802,619, filed March 30, 1959 and 799,416, filed March 16, 1959, now abandoned.

Example 1

3-chloropropionyl chloride (12.7 g.) was added dropwise to a stirred and cooled mixture of anhydrous sodium carbonate (10.6 g.) and N-methylpiperazine (10 g.) in dry acetone (150 ml.). The mixture was stirred at room temperature for two hours and filtered. The filtrate was evaporated to low volume under reduced pressure and excess of an ethereal solution of hydrogen chloride was added. The solvent was evaporated and the gummy residue was recrystallised from ethanol to give N-3-chloropropionyl-N'-methylpiperazine hydrochloride as small colourless plates melting at 190° with effervescence.

Example 2

N-3-chloropropionyl-N'-ethoxycarbonylpiperazine was prepared by the method of Example 1 from N-ethoxycarbonylpiperazine, and distilled at 164–166° at 0.5 mm.

Example 3

A solution of N-ethoxycarbonylpiperazine (31.6 g.) in benzene (100 ml.) was treated portionwise with shaking with a solution of 2-chloropropionyl chloride (2.7 g.) in benzene (25 ml.), reaction occurring spontaneously with the separation of crystals. The reaction mixture was then heated under reflux for two hours, cooled and filtered from N-ethoxycarbonylpiperazine hydrochloride. The filtrate was evaporated and distilled, N-2-chloropropionyl-N'-ethoxycarbonylpiperazine boiling at 152–154° at 0.8 mm. and slowly crystallising with cooling.

*Example 4*

N-ethoxycarbonylpiperazine and 4-chlorobutyryl chloride were reacted together according to the method of Example 3. The product N-4-chlorobutyryl-N'-ethoxycarbonylpiperazine distilled at 145–160° at 0.001 mm. as a colourless viscous oil.

*Example 5*

A solution of N-isobutylpiperazine (8.5 g.) in acetone (150 ml.) was stirred with anhydrous sodium carbonate (7.6 g.) at 0° and treated dropwise with 3-chloropropionyl chloride (9.1 g.) in acetone (18 ml.). The mixture was stirred for 4 hours and then filtered, the filtrate and acetone washings being added to a solution of toluene-p-sulphonic acid (10.25 g.) in acetone (20 ml.). A salt separated in high yield and was purified by recrystallisation from acetone, forming white leaflets, melting point 144–146°, of N-3-chloropropionyl-N'-isobutylpiperazine toluene-p-sulphonate.

The same method was used for the preparation of N-butyl-N' - 3 - chloropropionylpiperazine toluene-p-sulphonate, melting point 155.5–157°, the solvent for crystallisation being ethyl acetate/ethanol (3:2) which left undissolved a small amount of the toluene-p-sulphonate of unreacted N-butylpiperazine.

N-3-chloropropionyl-N'-pentylpiperazine toluene-p-sulphonate, melting point 158–159.5°, crystallised from ethyl acetate/ethanol (3:2), was prepared in the same way.

*Example 6*

N-isopropylpiperazine (12.8 g.) and 3-chloropropionyl chloride (12.7 g.) were brought into reaction in acetone by the method of Example 1. The acetone filtrate was treated with aqueous N-hydrochloric acid (100 ml.) and the solution was evaporated to dryness under reduced pressure. The residual solid was crystallised twice from alcohol forming white crystals of N-3-chloropropionyl-N'-isopropylpiperazine hydrochloride, melting point 185°.

N-2-chloropropionyl - N' - methylpiperazine hydrochloride was similarly prepared. Since this salt was not very readily obtained crystalline it was converted into the hydrogen maleate. The hydrochloride was dissolved in a small volume of ice-cold water and the solution was made just alkaline with ammonia. The liberated base was collected in ice-cold ethyl acetate and added to a solution of one molar equivalent of maleic acid in ethyl acetate. The salt thus precipitated was recrystallised from a small volume of water forming white crystals, melting point 130.5–131°.

N-chloroacetyl-N'-methylpiperazine hydrochloride was similarly prepared and crystallised from methanol-ethanol in white crystals, melting point 212–213° with decomposition.

*Example 7*

The reaction of N-2-methoxyethylpiperazine and 3-chloropropionyl chloride by the method of Example 6 afforded N - 3 - chloropropionyl-N'-2-methoxyethylpiperazine hydrochloride which crystallised from isopropanol in white prismatic needles, melting point 151.5–152°.

*Example 8*

The reaction of N-2-hydroxyethylpiperazine and 3-chloropropionyl chloride by the method of Example 5 furnished a high yield of N-3-chloropropionyl-N'-2-hydroxyethylpiperazine toluene-p-sulphonate which crystallised from alcohol in white leaflets, melting point 151–153°.

*Example 9*

N-methylpiperazine (10 g.) and 3-bromopropionyl chloride (20.5 g.) were reacted in acetone solution in the presence of anhydrous sodium carbonate by the method of Example 1. The acetone solution obtained by filtration was treated with aqueous N-hydrochloric acid (100 ml.) and the resulting solution was evaporated to dryness under reduced pressure. The gummy residue was evaporated successively with ethanol and isopropanol and was thus converted into a solid which was crystallised twice from alcohol forming white leaflets, melting point 179–180° with decomposition, of N-3-bromopropionyl-N'-methylpiperazine hydrochloride.

*Example 10*

To a cooled and stirred mixture of N-ethylpiperazine (5.7 g.) and anhydrous sodium carbonate (6.4 g.) in dry acetone (75 ml.) was added 3-chloropropionyl chloride (7 g.) at such a rate that the temperature remained at 20–25°. After stirring for 2 hours at room temperature, the mixture was filtered and the solid washed well with acetone. To the filtrate was added excess of an ethereal solution of hydrogen chloride, precipitating an oil which solidified. The solid crystallised from isopropanol in small plates, melting point 171–172°, of N-3-chloropropionyl-N'-ethylpiperazine hydrochloride.

The following compounds were prepared in the same way from N-ethylpiperazine and the appropriate acid chloride:

N-chloroacetyl-N'-ethylpiperazine hydrochloride, forming needles, melting point 210° (efferv.), from ethanol.

N-4-chlorobutylryl - N' - ethylpiperazine hydrochloride, needles melting point 165–167°, from isopropanol.

*Example 11*

N-ethoxycarbonylmethylpiperazine reacted with chloroacetyl chloride under the conditions of Example 1 to give N-chloroacetyl-N'-ethoxycarbonylmethylpiperazine hydrochloride, which crystallised from isopropanol in needles, melting point 165° (efferv.).

Prepared similarly, N-3-chloropropionyl-N'-ethoxycarbonylmethylpiperazine hydrochloride formed prisms, melting point 115–117°, from isopropanol.

*Example 12*

N-ethoxycarbonylmethylpiperazine and 4-chlorobutyryl chloride reacted together under the conditions of Example 5 to give N-4-chlorobutyryl-N'-ethoxycarbonylmethylpiperazine toluene-p-sulphonate as small plates, melting point 135–137°, after crystallisation from isopropanol.

The following compounds were made by methods analogous to those of previous examples:

(a) N - 3 - chloropropionylpiperazine hydrochloride, M.P. 158°, from ethanol;

(b) N-3-chloropropionyl-N'-n-propylpiperazine hydrochloride, M.P. 148–150°, from acetone;

(c) N-3-chloropropionyl-N'-2-hydroxypropylpiperazine hydrochloride, M.P. 186°, from ethanol;

(d) N-3-chloropropionyl-N'-3-hydroxybutylpiperazine hydrochloride, M.P. 161–163°, from isopropanol;

(e) N-3-bromopropionyl-N'-isopropylpiperazine hydrochloride, M.P. 174–175°, from ethanol;

(f) N - 5 - chloropentanoyl-N'-methylpiperazine hydrochloride, M.P. 141–143°, from isopropanol-ethyl acetate;

(g) N-5-chloropentanoyl-N'-ethylpiperazine hydrochloride, M.P. 161–163°, from isopropanol-ethyl acetate;

(h) N-5-chloropentanoyl-N'-isopropylpiperazine hydrochloride, M.P. 187–189°, from isopropanol-ethyl acetate;

(i) N-5-chloropentanoyl-N'-ethoxycarbonylpiperazine, M.P. 66–68°, from ether; and (j) N - 6 - chlorohexanoyl-N'-methylpiperazine hydrochloride, M.P. 136–138°, from isopropanol.

What we claim is:

1. A compound selected from the class consisting of the free bases of the formula:

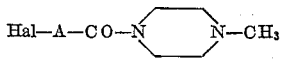

and the therapeutically acceptable acid addition salts thereof, in which formula Hal is selected from the class consisting of the chlorine, bromine and iodine atoms, and A is selected from the class consisting of the straight and branched bivalent aliphatic hydrocarbon radicals having from two to ten carbon atoms.

2. A therapeutically acceptable acid addition salt of N-3-chloropropionyl-N'-methylpiperazine.

3. A therapeutically acceptable acid addition salt of N-2-chloropropionyl-N'-methylpiperazine.

4. A therapeutically acceptable acid addition salt of N-3-bromopropionyl-N'-methylpiperazine.

5. A therapeutically acceptable acid addition salt of N-3-chloropentanoyl-N'-methylpiperazine.

6. A therapeutically acceptable acid addition salt of N-6-chlorohexanoyl-N'-methylpiperazine.

References Cited in the file of this patent

UNITED STATES PATENTS

| | | |
|---|---|---|
| 2,643,255 | Morren | June 23, 1953 |
| 2,807,617 | Dalalian et al. | Sept. 24, 1957 |
| 2,909,524 | Dalalian et al. | Oct. 20, 1959 |

FOREIGN PATENTS

| | | |
|---|---|---|
| 666,457 | Great Britain | Feb. 13, 1952 |